Figure 1:
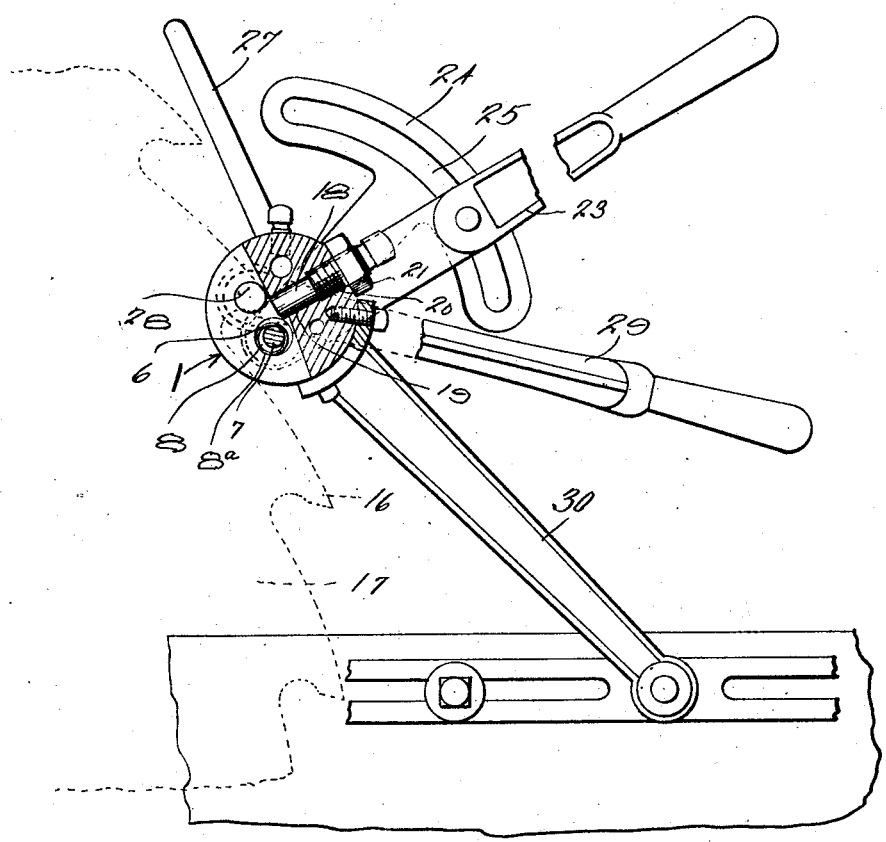

H. M. KING.
SAW SWAGE.
APPLICATION FILED AUG. 23, 1919.

1,388,724.

Patented Aug. 23, 1921.
2 SHEETS—SHEET 1.

Inventor
H. M King

Witnesses

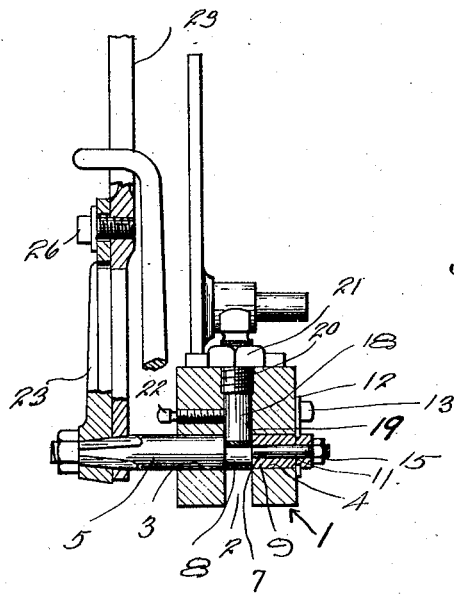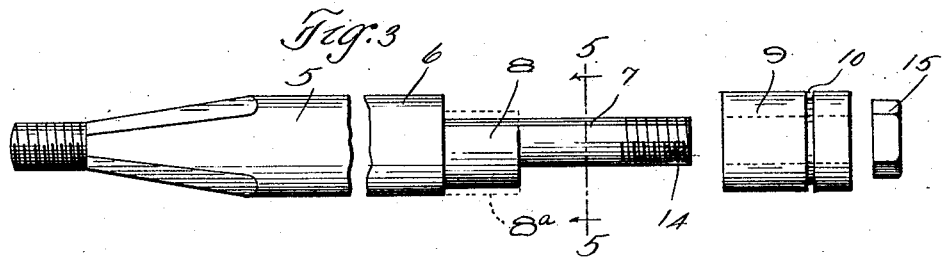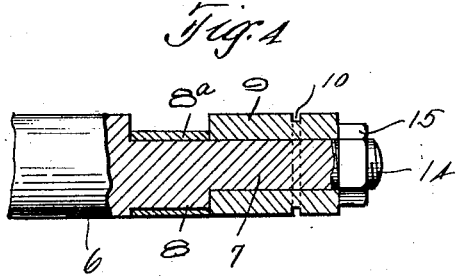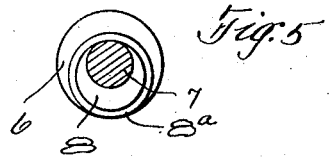

UNITED STATES PATENT OFFICE.

HENRY M. KING, OF CLAYTON, OKLAHOMA.

SAW-SWAGE.

1,388,724. Specification of Letters Patent. Patented Aug. 23, 1921.

Application filed August 23, 1919. Serial No. 319,335.

*To all whom it may concern:*

Be it known that I, HENRY M. KING, a citizen of the United States, residing at Clayton, in the county of Pushmataha and State of Oklahoma, have invented certain new and useful Improvements in Saw-Swages; and I do hereby declare the following to be a full, clear, and exact description of the invention, such as will enable others skilled in the art to which it appertains to make and use the same.

The invention relates to improvements in saw swages.

The object of the present invention is to improve the construction of saw swages of that type in which the teeth of a saw are upset against an anvil by a movable die and to provide a simple, practical and efficient saw swage equipped with a perfect eccentric tooth engaging die adapted to roll out the metal and at the same time compress the same, whereby splitting of the metal and impairing the strength of the same and causing the corners of the teeth to sliver are effectually prevented.

Heretofore saw swages have been equipped with rotary eccentric dies formed by grooving or slotting a die between two integral bearing portions of uniform diameter and it has been found by experience that difficulty has been experienced in obtaining a properly operated die with such a construction which has a tendency to drag out or sliver the tooth and cause the corners to crumble.

It is the primary object of the present invention to provide a rotary tooth engaging die having a true and perfect eccentric and to enable the same to be properly supported to secure an accurate swaging of a saw tooth.

With these and other objects in view the invention consists in the construction and novel combination and arrangement of parts hereinafter fully described, illustrated in the accompanying drawings and pointed out in the claim hereto appended, it being understood that various changes in the form, proportion and minor details of construction may be resorted to without departing from the spirit or sacrificing any of the advantages of the invention.

In the drawings—

Figure 1 is a vertical sectional view of a saw swage provided with an eccentric tooth engaging die constructed in accordance with this invention, Fig. 2 is a transverse sectional view of the same, Fig. 3 is a side elevation of the eccentric die and bearing ring, the parts being separated, Fig. 4 is a detail sectional view taken longitudinally of the bearing ring, Fig. 5 is a transverse sectional view on the line 2—2 of Fig. 3.

Like numerals of reference designate corresponding parts in the several figures of the drawings.

In the accompanying drawings in which is illustrated the preferred embodiment of the invention, the saw swage comprises in its construction, a substantially cylindrical body 1 provided with a longitudinally disposed saw receiving slot 2 and having bearing openings 3 and 4 for the reception of a rotary tooth engaging die 5. The rotary die 5 is provided with inner and outer concentric bearing portions 6 and 7 and it has an intermediate eccentric tooth swaging portion 8 located between the inner and outer bearing portions, the eccentric and the outer bearing portion being formed by successive reduction of the die 5 to permit a tooth engaging ring 8ª to be placed on the eccentric. By constructing the eccentric 8 in this manner a true and perfect eccentric may be obtained and it has been found by experience that an eccentric constructed in this manner with the ring 8ª will roll out the metal of a saw tooth and compress the same without impairing the strength of the metal or otherwise injuring the tooth or cause the same to sliver off and shed at the corners as is the case when an eccentric rubs across and creates an abrading and crushing action while swaging the tooth. This form of eccentric swaging die will give longer life to the corners of a tooth and produce a better body at the back of the tooth for supporting the corners and thereby enable the tooth to stand much harder service. The inner bearing portion 6 fits the inner bearing opening 3 and the outer bearing portion 7 is arranged within a bearing ring or sleeve 9 which is arranged within the outer bearing opening 4 of the body 1. The sleeve or ring 9 is adapted to limit the movement of the ring 8ª in one direction and provides means whereby said ring 8ª may be removed from the swaging portion 8 of the rotary guide 5. The bearing ring or sleeve 9 which projects beyond the adjacent side face of the body 1 is provided with an annular groove 10 which is engaged by a curved edge 11 of a plate 12 that is pivotally clamped by a screw 13 mounted on the body. The terminal portion 14 of the eccentric tooth engaging die is threaded for the reception of a nut 15 which is arranged at the outer end of the bearing ring or sleeve 9 as clearly illustrated in Fig. 4 of the drawings. The teeth 16 of the saw 17 are swaged against an anvil 18 which is adjusted in an opening 19 in the usual manner by a screw 20 which is equipped with a lock nut 21, and the said anvil is clamped in its adjustment by a screw 22.

The eccentric die is partially rotated by an operating lever 23 pivotally mounted on the die in the usual manner and adjustably connected with the same by an arm 23 having an outer portion 24 provided with an arcuate slot 25 in which operates a suitable fastening device 26. The lever is also limited in its adjustment by a suitable stop 27 and the saw is clamped in the usual manner by clamping screws 28 one of which is equipped with an operating handle or lever 29. The body is supported by an arm 30 and the saw swage is operated in the usual manner, by clamping the saw with the said screws 28 with one of its teeth fitted against the anvil and then partially rotating the eccentric swaging die.

What is claimed is:—

A saw swage comprising a body having openings and a saw receiving slot, an anvil carried by said body, a spindle extending through the openings and slot and having concentric outer portions located in the openings and one of said portions spaced from the wall of its respective opening, and of a diameter less than the diameter of the other portion, a sleeve on the small concentric portion and engaging the wall of said last opening and having one end extending beyond the body and provided with an annular groove, a plate pivoted to the body and having a curved edge engaging the groove, an eccentric portion formed on the spindle and located in the slot, a ring mounted on said eccentric portion and engaging the large concentric portion at one end and engaging the sleeve at its other end and of a diameter greater than the diameter of the small concentric portion, and an operating means for the spindle.

In testimony whereof I affix my signature in presence of two witnesses.

HENRY M. KING.

Witnesses:
VIVIAN NEVINS,
J. M. DREW.